C. E. L. LIPMAN.
CONTROLLING VALVE FOR PRESSURE GAGES.
APPLICATION FILED APR. 1, 1915.
1,184,655.
Patented May 23, 1916.
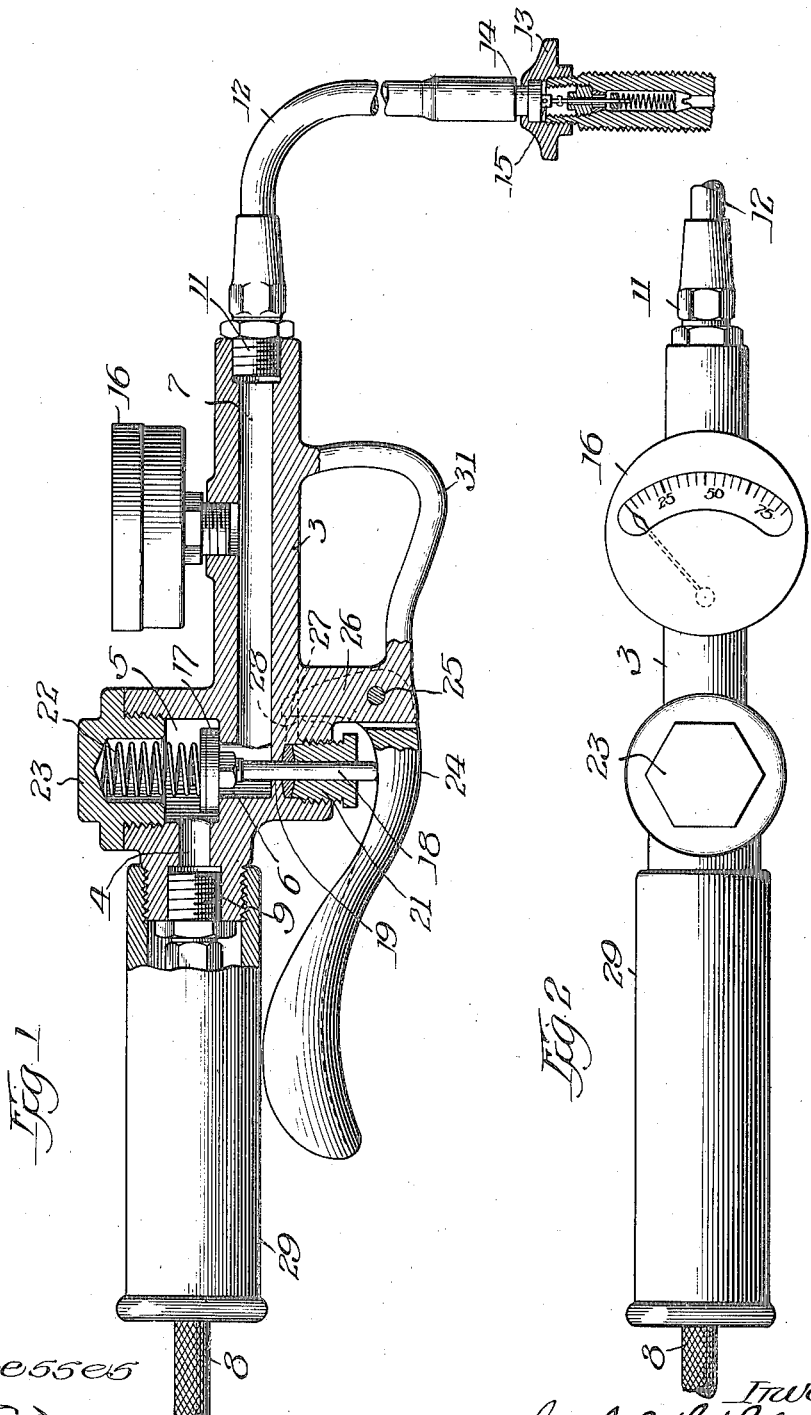

UNITED STATES PATENT OFFICE.

CARL E. L. LIPMAN, OF BELOIT, WISCONSIN, ASSIGNOR TO LIPMAN AIR APPLIANCE CO., OF BELOIT, WISCONSIN, A CORPORATION OF WISCONSIN.

CONTROLLING-VALVE FOR PRESSURE-GAGES.

1,184,655.

Specification of Letters Patent.

Patented May 23, 1916.

Application filed April 1, 1915. Serial No. 18,523.

*To all whom it may concern:*

Be it known that I, CARL E. L. LIPMAN, a citizen of the United States, residing at Beloit, in the county of Rock and State of Wisconsin, have invented certain new and useful Improvements in Controlling-Valves for Pressure-Gages, of which the following is a specification.

This invention relates to a controlling valve for air gages to be interposed between an air pressure tank and an air receiver, a mode of use more particularly contemplated being to include the controlling device in a piping between an air pressure tank and a valve on a pneumatic tire whereby a tire may be accurately inflated under immediate control of an operator.

The primary object of my invention is to provide a simple means whereby an operator may easily and conveniently control the passage of air from an air pressure tank to an air receiver and may, at will, obtain an accurate indication on the gage of the actual air pressure in the receiver. In other words, in the particular use for which I have designed my improvements, that is, in a tire inflating apparatus, the valve controlling device and gage may be positioned at a convenient point on the piping and an operator by actuating a single finger lever may supply air under pressure to the tire and upon release of the lever obtain on the gage an indication of the actual air pressure in the tire, it being obvious that while the tire is being inflated the gage will indicate the pressure of the supplying air rather than that actually in the tire.

Another object of my invention is to provide a device of the above described character with valve-controlling means so arranged in association with a handle for holding the device that the valve may be controlled by a slight finger movement of the operator to effect the functions of the device.

A further object is to provide a device of the aforesaid character, simple in design and construction, effective in operation, and which may be manufactured at a low cost.

Referring to the drawings:—Figure 1 is a view partly in longitudinal section and partly in side elevation of my improved valve controlling device for gages, showing the same in connection with a piping attached to an ordinary tire valve; Fig. 2 is a top plan view of the device.

By reference to the drawings, it will be observed that the valve, control therefor, and the gage are embodied in a casing designated in general by reference character 3. This casing is shaped to provide an air inlet passage 4 leading to a valve chamber 5 which communicates through an opening 6 in the bottom thereof with a passage 7 serving as the air outlet from the casing. During usage the casing is connected with a tank (not shown) containing air under pressure by a pipe or hose 8 suitably connected with the air inlet end of the casing, such connection being effected in the present instance by a hose-attached coupling 9 screw-threaded into the air inlet passage 4. The outlet end of the casing has suitably connected thereto, by a coupling 11 screw-threaded into the outlet end of the passage 7, a hose 12 which has attached to its opposite end means for connecting the hose to a tire valve nipple and at the same time holding the valve member thereof unseated. This means may be of any suitable construction and, as illustrated, comprises an internally threaded cap 13 revolubly mounted on a head 14 inserted into the end of the hose 12, the cap 13 being adapted to screw onto the end of the valve nipple and to draw a reduced end 15 of the said head 14 into engagement with the valve stem to hold the valve open. A suitable air pressure indicating gage 16 is mounted on the casing 3 in communication with the passage 7. Located in the valve chamber 5 is a disk valve 17 seated upon the bottom of said chamber closing the opening 6 leading to the passage 7. The check valve has rigidly attached thereto a depending valve stem 18 passing through an aperture 19 in the casing to the exterior thereof. A suitable packing and gland designated as a whole by 21 precludes the escape of air from the passage 7 through the aperture 19. The valve 17 is yieldingly held seated by a coiled spring 22 interposed between the valve and a cap 23 screw-threaded into the top of the valve chamber. This spring is of sufficient tension to hold the valve seated against a maximum pressure that might be supplied to the air receiver, or in the present case, to the tire.

Manually operable means is provided for unseating the valve 17, and comprises a bell crank lever 24 pivotally mounted at 25 on a lug 26 depending from the casing 3 adjacent to the valve end thereof. One end of the lever extends beneath the valve stem 18 and is suitably shaped at its outer end in the form of a finger trigger, the opposite arm 27 of the lever extending upwardly into engagement with a stop 28 of the casing 3 whereby to limit downward movement of the trigger end of the lever. It is obvious that since the lower end of the valve stem 18 abuts against the lever 24, the said lever may be rocked on its pivot 25 to raise the valve stem and unseat the valve against the tension of the spring 22. A handle is provided by which an operator may conveniently hold the casing 3 in one hand, the said handle being positioned in such relation to the valve operating member 24 that the operator may conveniently operate said member 24 without releasing his grip upon the handle. This handle as here shown, comprises a hollow cylindrical member 29 encircling the pipe 8 and screw-threaded onto the inlet end of the casing 3 in the manner clearly shown in the drawings. The casing 3 is provided on its under side with a loop 31 affording means whereby the device may be hung on a suitable hook while not in use.

From the foregoing it will be apparent that the casing 3 may be mounted on the piping or hose at any desirable point intermediate the air pressure tank and the end of a hose adapted to be attached to a tire valve, and may be conveniently held by an operator in such position as to afford an immediate view of the air gage at any time, whereby the valve controlling member may be operated at will to accurately control the supply of air to the tire.

The operative parts of the device, considering the same connected to a pressure tank and tire valve, normally assume the positions shown in Fig. 1, wherein air from the pressure tank will be stopped from passage through the casing 3 by the valve 17. When it is desired to pass air under pressure to the tire, the trigger 24 is raised by the operator, unseating the valve 17 against the tension of the spring 22 and permitting the supplying of air through the passage 7 and hose 12 to the tire valve, thereby inflating the tire. It is obvious that since the air gage 16 is on the piping subject to the pressure of the supplying air the pressure of said supplying air in the passage will be indicated by the gage rather than the actual pressure of the air in the tire. To determine the actual air pressure in the tire, the operator releases the trigger, whereupon the valve 17 will be automatically seated by action of spring 22, thus stopping the passage of supplying air at the entrance side of the point of communication of the air gage with the passage 7 and permitting the actual pressure of the air in the tire to be present in the passage 7 and to be indicated on the air gage. Since the tension of the spring 22 is sufficient to hold the valve 17 seated against the maximum pressure that might be supplied to the tire, the said valve will automatically prevent back passage of the air beyond the passage 6.

I claim:—

In a device of the character described, the combination of a casing having a valve chamber and an offset bore adapted to be connected at opposite ends with an air pressure tank and an automobile tire respectively, a valve in said chamber movable transversely with respect to the longitudinal axis of the bore normally seated upon a shoulder formed at the offset of said bore and having a stem extending downwardly through the casing, a cap closing the upper end of said chamber, a spring for normally holding said valve in closed position, a pressure gage mounted horizontally on the upper side of said casing and connecting with the bore at the delivery side of said valve, a handle attached to the casing, and a valve operating lever mounted on the casing and extending beneath and into proximity to said handle in position to be operated by the hand which grasps the handle.

CARL E. L. LIPMAN.

Witnesses:
 IRA J. WILSON,
 A. G. LATIMER.